United States Patent [19]

Peck et al.

[11] Patent Number: 4,578,945
[45] Date of Patent: Apr. 1, 1986

[54] OVERSPEED LIMITER FOR GAS TURBINE FUEL CONTROL

[75] Inventors: Robert E. Peck, Prospect; Albert H. White, Wethersfield, both of Conn.

[73] Assignee: Chandler Evans Inc., West Hartford, Conn.

[21] Appl. No.: 550,610

[22] Filed: Nov. 10, 1983

[51] Int. Cl.⁴ .............................................. F02C 9/28
[52] U.S. Cl. .................................................. 60/39.281
[58] Field of Search ..................................... 60/39.281

[56] References Cited
U.S. PATENT DOCUMENTS

| | | | |
|---|---|---|---|
| 3,155,165 | 11/1964 | Boyer et al. | 60/39.281 |
| 4,302,931 | 12/1981 | White et al. | 60/39.281 |
| 4,337,617 | 7/1982 | Smith | 60/39.281 |
| 4,473,999 | 10/1984 | Smith | 60/39.281 |

Primary Examiner—Louis J. Casaregola
Attorney, Agent, or Firm—Radford W. Luther; Richard A. Dornon

[57] ABSTRACT

A fuel control for a gas turbine engine has a positive displacement pump (28) for supplying fuel to the engine. Fuel flow from the pump is metered by a metering valve (30) which has a constant pressure head held across it by a metering head regulator valve (48) adapted to bypass flow around the pump in a conduit (50). An overspeed valve and solenoid assembly (42) is positioned in the control downstream of the metering valve for shutting off fuel flow to the engine in the event of an overspeed of a turbine of the engine. The metering head regulator valve is referenced to a pressure downstream of the overspeed valve and solenoid assembly by a pressure sense line (68). The solenoid (96) is controlled by a dual channel overspeed valve control circuit (102) having proportional plus derivative gains (108, 110). When the overspeed valve (76) of the assembly is operated, the pump is not deadheaded because the metering head regulator valve is referenced to a lower pressure downstream of the overspeed valve. By not deadheading the pump, faster fuel shutoff can be achieved and leakage across the overspeed valve minimized.

1 Claim, 2 Drawing Figures

OVERSPEED LIMITER FOR GAS TURBINE FUEL CONTROL

TECHNICAL FIELD

This invention relates to gas turbine engine fuel controls and more particularly, to overspeed limiters.

BACKGROUND ART

Various forms of overspeed limiters for gas turbine engines are known in the prior art. The function of an overspeed limiter is to prevent the occurrence of excessive turbine speeds by limiting fuel flow to the engine. Examples of overspeed limiters may be found in U.S. Pat. Nos. 3,936,649 and 4,302,931. While state of the art overspeed limiters generally perform in a satisfactory manner, the fuel pump is generally deadheaded upon their being placed in operation. Substantial deadheading of the pump adversely affects reaction time of the overspeed limiter and may contribute to fuel leaking of the engine because of the inordinately high pressure differentials. Positive and rapid fuel shutoff to an engine may be necessary to forestall a disasterous engine or rotor disintegration particularly in the event of a shaft failure. In addition, repeated overspeeds, not of a critical nature, materially shorten engine life.

DISCLOSURE OF INVENTION

In accordance with the invention, there is provided an overspeed limiter for a fuel control which incorporates an overspeed valve downstream of the main fuel metering valve for shutting off fuel flow to the engine. The metering head regulator is referenced to fuel pressure downstream of the overspeed valve such that when the overspeed valve closes pump flow will not be substantially deadheaded but will proceed through its normal bypass loop around the pump, generally untrammeled by the metering regulator. Because large pressures are not developed in the fuel supply conduit (which may be only about 20 psi above boost pressure) during overspeeds, the overspeed valve may react quickly to control signals and positively shutoff fuel to the engine when seated.

The overspeed valve may be controlled by a detector which senses turbine speed and provides proportional plus derivative gains. The derivative gain may be sized to immediately actuate the overspeed valve for turbine acceleration rates of an order of magnitude faster than normal.

Accordingly, it is a primary object of the invention to provide an overspeed limiter for a fuel control for a gas turbine engine which will not deadhead the pump upon activation.

Another object is to provide an overspeed limiter for a fuel control for a gas turbine engine which may react quickly to turbine overspeeds and positively shutoff fuel flow to the engine.

These and other objects and advantages of the invention will become more readily apparent from the following detailed description, when taken in conjunction with the accompanying drawings, in which:

BEST MODE OF CARRYING OUT THE INVENTION

Figure 1:
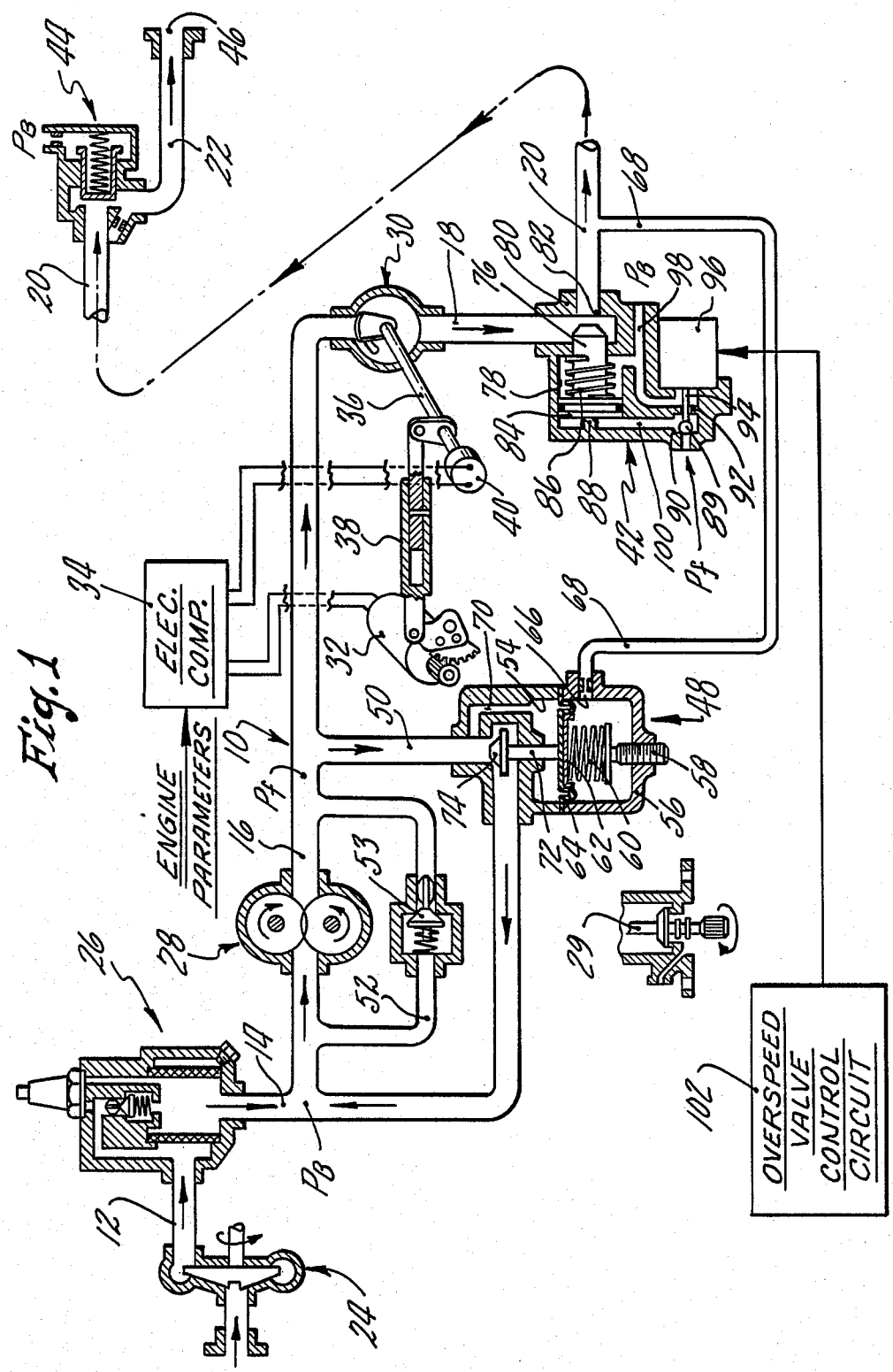
FIG. 1 is a schematic illustration of the hydromechanical section of a fuel control for a gas turbine engine which incorporates a preferred overspeed limiter according to the invention.

Referring to the drawings, and more particularly to FIG. 1, there is shown a fuel control for a gas turbine engine. With the exception of the overspeed limiter of the invention the fuel control depicted is generally conventional. The fuel control comprises a main fuel supply conduit generally designated 10 having conduit segments 12, 14, 16, 18, 20 and 22. The various elements, including the conduit segments, which constitute the fuel control may be mounted in a plural cavity housing or separate housings.

Fuel from a tank (not shown) enters a centrifugal boost pump 24 and proceeds thence to a fuel filter 26 through conduit segment 12. Fuel flow from the filter traverses conduit segment 14 to the inlet of a positive displacement pump, shown as gear pump 28. Gear pump 28 is driven by a shaft 29 connected to the engine gearbox. The discharge flow of the gear pump 28 enters conduit segment 16 and proceeds to a main metering valve 30 which is of the sliding plate type. The metering area of the main metering valve 30 is varied by a stepper motor 32 controlled by an electronic computer 34 which senses selected engine parameters. The main metering valve 30 has a rotatable positioning shaft 36 attached thereto which is connected to the stepper motor by means of a linkage 38 which incorporates a sector gear in engagement with the output gear on the stepper motor. Main metering valve position feedback is furnished by a potentiometer 40 connected to the shaft 36. Metered flow from the main metering valve 30 enters conduit segment 18, proceeds past an overspeed valve and solenoid assembly 42 to conduit segment 20 and finally traverses a pressurizing valve 44 before entering conduit segment 22 which communicates with a metered flow outlet 46.

The pressure differential or metering head (PF-PM) across the main metering valve 30 is maintained at a constant value by a metering head regulator 48 incorporated in a bypass conduit 50 which fluidly interconnects the discharge and inlet sides of the gear pumps 28 and joins with conduit segments 16 and 14. The metering head regulator 48 will always bypass sufficient flow to maintain the aforementioned head at a constant valve (e.g., 20 psi). Because of the constant head maintained thereacross, metered flow is purely a function of metering valve position. A pressure relief line 52 also fluidly interconnects the inlet and discharge sides of the gear pump 28 and incorporates a high pressure relief valve 53 adapted to crack at, for example, 400 psi.

The metering head regulator 48, which is conventional, is disposed within a cavity 54 formed in housing 56. A manually adjustable spring seat 58 is threadably mounted in the lower portion of the housing 56 for preloading a compression spring 60 which bears against the diaphragm washer 62 of a diaphragm 64. The diaphragm washer 62 divides the cavity 64 into an upper chamber and a lower chamber. A port 66, formed in the wall of the housing 56 and incorporating a damping orifice, communicates with the lower chamber and senses the pressure in conduit segment 20, which is downstream of the overspeed valve and solenoid assembly 42, via a pressure sense line 68. The upper chamber in reference to the pump discharge pressure PF by means of a pressure sensing conduit 70 in the housing 56. Projecting inwardly from the diaphragm washer 64 is a valve spool 72 which extends through the upper chamber a portion of the housing 65 and is slidable therein. The valve spool 72 has a flange at its upper end to restrict flow in the bypass conduit 50 such that the pressure imposed across the metering valve 30 remains essentially constant.

The overspeed valve and solenoid assembly 42 comprises a valve 76 mounted in cavity 78 in housing 80 for axial sliding movement therein between a normal position depicted in FIG. 1, in which there is no impediment to flow between the conduit segments 18 and 20, and a closed position in which the right end of the valve 76 engages a seat 82 in the housing 80 to shutoff flow between the conduit segments 18 and 20. The valve 76 has an enlarged diameter base, 84 the periphery of which engages the wall of the cavity 78. A compression spring 86 is seated upon the front or right wall of the cavity 78 and the annular section of the base 84 for urging the piston to the left, into its normal illustrated position. A stop 88 in the housing engages the base 84 to provide a space between the rear wall of the cavity and the base whereby the back of the piston may be exposed to a selected pressure.

A ball valve 89 is movable in the housing to seat against two orifices 90 and 92. Normally, the ball valve 89 is held in seated engagement with the orifice 90 by the spring loaded plunger 94 of a solenoid 96 which extends through the orifice 92 but does not affect fluid communication therethrough. The solenoid 96 is shown in its normal or de-energized condition. A passage 98 in the housing 80, which is referenced to boost pressure PB, communicates with the orifice 92 and also with the annular area of the base 84. A passage 100 in the housing 80 normally communicates with the orifice 92 so as to subject the back of the valve 76 to boost pressure.

The orifice 90 is in communication with a much higher pressure PF, the discharge pressure of the pump 28. The back of the valve 76 is normally never exposed to this high pressure because of the seating of the valve 89 against the orifice 90. However, when the solenoid 96 is energized, plunger 94 withdraws to the right allowing the pressure PF to displace the seated ball valve 89 into seated engagement with the orifice 92, thereby referencing the back of the valve 76 to the pressure PF which results in its displacement to the right into seated engagement with the seat 82. When the ball valve 89 seats against the orifice 82, the annular area of the base 84 will, of course, continue to be exposed to boost pressure PB.

Figure 2:
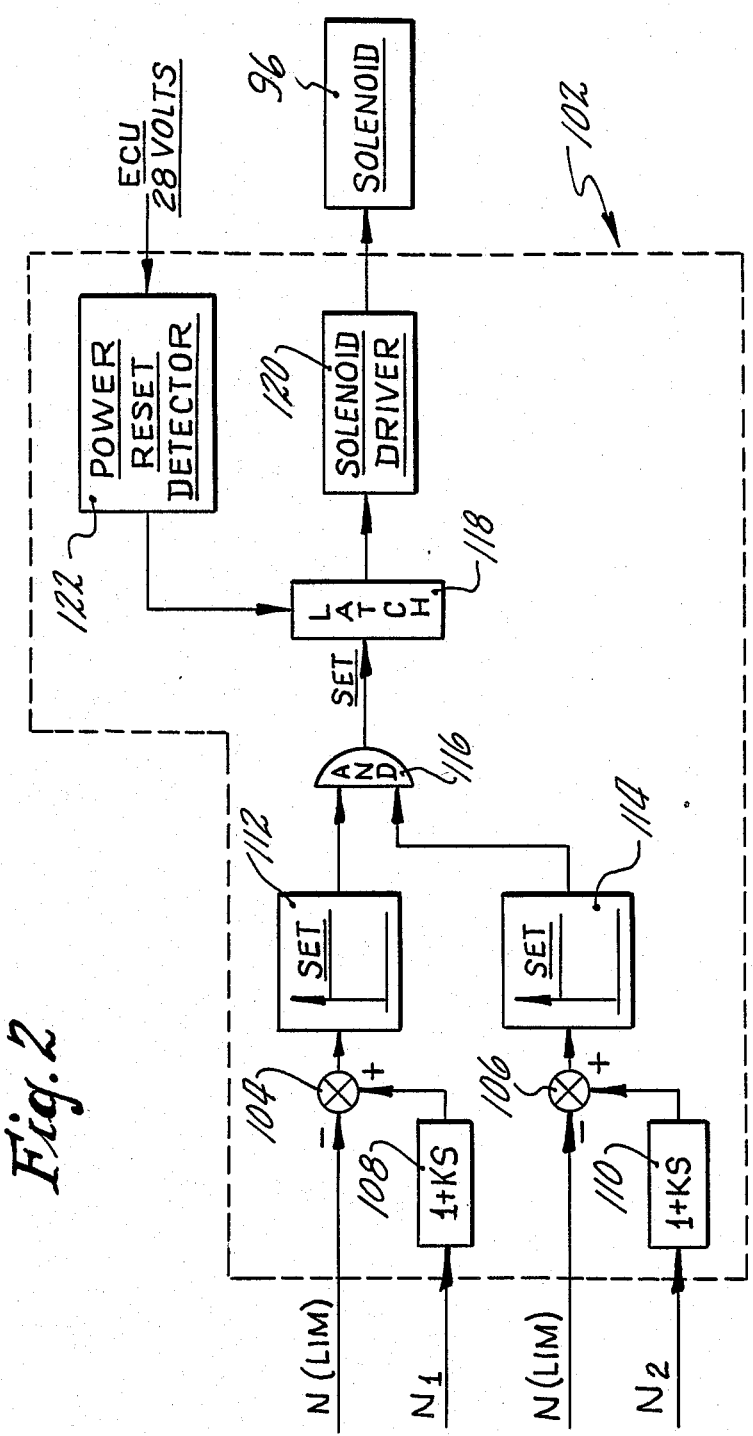
FIG. 2 is a schematic representation of a preferred form of analog control for the overspeed valve of FIG. 1.

An overspeed valve control circuit 102 applies current to the solenoid 96 when a potentially imminent overspeed is indicated. As shown in FIG. 2, an analog circuit is provided for controlling the solenoid. While the circuit of FIG. 2 is not associated with the electronic digital computer 34 it senses turbine speed N as would the electronic computer.

A signal N(LIM) indicative of a limit or maximum desired turbine speed is applied to two summing junctions 104 and 106 which also respectively receive as inputs the outputs of two proportional plus derivative gain circuits 108 and 110. The circuits 108 and 110 have as their respective inputs the signals $N_1$ and $N_2$ which are both indicative of actual turbine speed. The summing junctions 104 and 106 subtract the respective differences between N (LIM) and the outputs of the circuits 108 and 110 and apply the result to respective threshold sensing switches 112 and 114. Should the differences between the inputs to the summing junctions be of a sufficient magnitude, the switches 112 and 114 will each apply a setting output signal to an AND gate 116 which will be enabled and generate a trip or set signal to a latch 118. When the latch 118 receives a tripping signal, it will continuously apply a gating signal to a solenoid driver 120 (e.g., a darlington transistor) which is connected to the solenoid 96 for directing current therethrough. Latch 118 will maintain the solenoid 96 in an energized state until reset by a power reset detector 122 controlled by a signal from the electronic computer 34.

By providing two channels in the overspeed valve control circuit which each sense limit speed and actual speed, a single failure or spurious shutdown signal is unlikely to be generated since both channels must have outputs present at the input of the AND gate 116 in order for it to be enabled. In addition, the derivative gain is not likely to result in unwanted shutdowns since, during normal speed transients, the derivative gain will be sized to have little effect whereby the turbine speed may be allowed to operate within its normal overspeed limit. However, where turbine acceleration rates are of a magnitude far greater than normal, (which may indicate some form of shaft failure) the derivative gain will be large enough to result in energization of the solenoid and prevent excessive turbine overspeed.

Upon energization of the solenoid 96, high pressure $P_F$ will be directed behind the valve 76, thereby causing it to move toward the seat 82. The pressure in the conduit segment 20 which communicates with the regulator 48 via pressure sense line 68 and is normally the same as that in the conduit segment 18, will be progressively reduced, thereby referencing the lower chamber of the cavity 54 to a progressively lower pressure. The lowering of pressure in the lower chamber of the cavity 54, allows the pressure differential across the diaphragm 64, to move it, and hence the valve 72, downwardly, thereby opening the bypass conduit and allowing pump discharge to be bypassed back to the inlet. Because the pressure in the conduit segment 18 will be at a somewhat reasonable level during the axial closing movement of the valve 76, the end of the piston may become seated more quickly. Of course, after seating of the end of the valve 76, the pressure differential across the overspeed valve 76 will not be such as to cause any significant leakage (and would typically be about 20 psi) because the pump cannot develop inordinately high pressures due to the opening of the bypass conduit 50.

Obviously many modifications and variations are possible in light of the above teachings without departing from the scope or spirit of the invention as defined in the appended claims. For example, if desired, the overspeed valve and solenoid assembly could be pulse width modulated as exemplified in U.S. Pat. No. 4,302,931. Moreover, it will be appreciated that the control need not embody any electronics but could be purely hydromechanical.

What is claimed is:

1. In an improved fuel control for a gas turbine engine of the type having a main fuel supply conduit, a positive displacement pump for pumping fuel through the main fuel supply conduit, a metering valve positioned in the main fuel supply conduit downstream of the pump for metering the flow of fuel therethrough, a bypass conduit fluidly connecting the main fuel supply conduit on the discharge side of the pump to the main fuel supply conduit on the inlet side of the pump, a metering head regulator valve in the bypass conduit responsive to the pressure differential across the metering valve for regulating the flow in the bypass conduit so as to maintain a constant differential pressure across the metering valve and an overspeed valve mounted in the main fuel supply conduit for restricting fuel flow therethrough in response to overspeeds, the overspeed valve being mounted in the main fuel supply conduit downstream of the metering valve, means for referencing the metering head regulator valve to a pressure downstream of the overspeed valve and means for operating the overspeed valve, the improvement in the operating means comprising:

- a pressure directing valve in the fuel control for directing high pressure to the overspeed valve for producing a displacement thereof to a position in which fuel flow is restricted;
- a solenoid for operating the pressure directing valve;
- means responsive to engine speed for operating the solenoid, the engine speed responsive means comprising:

- first and second means responsive to engine speed for respectively generating two first signals which are functions of the engine speed and engine acceleration;
- first and second means to respectively subtract from the first signals two second signals, each of which is indicative of a limit engine speed, and generate respective first and second output signals;
- first and second threshold sensing switch means responsive to the first and second output signals for respectively generating first and second setting signals when the first and second output signals respectively exceed a predetermined value;
- means for generating an output setting signal in response to the presence of first and second setting signals; and
- means responsive to the output setting signal for directing current through the solenoid.

* * * * *